M. L. WILLIAMS.
ARMORED VEHICLE TIRE.
APPLICATION FILED FEB. 12, 1906.
951,087.
Patented Mar. 1, 1910.
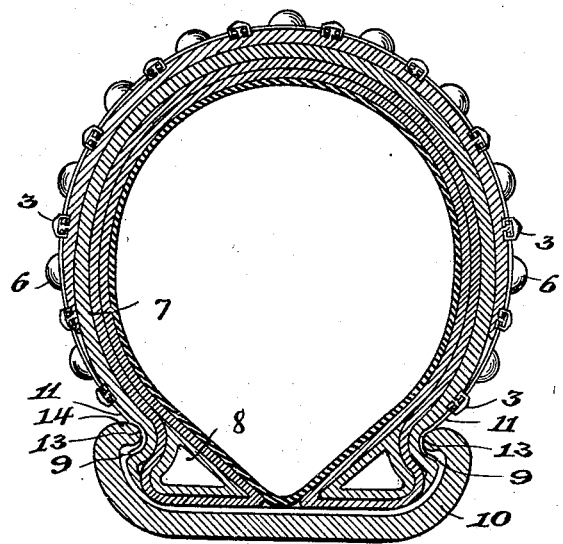
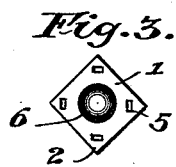
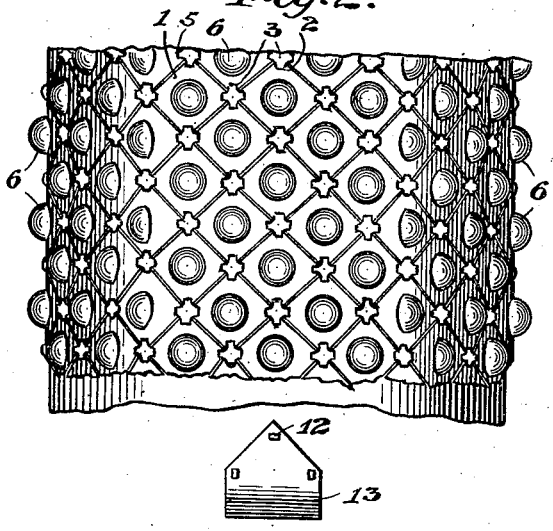
Witnesses,
Inventor,
Martin L. Williams,
By Albert N. Graves
Atty.

UNITED STATES PATENT OFFICE.

MARTIN L. WILLIAMS, OF SOUTH BEND, INDIANA.

ARMORED VEHICLE-TIRE.

951,087.  Specification of Letters Patent.  Patented Mar. 1, 1910.

Application filed February 12, 1906. Serial No. 300,557.

*To all whom it may concern:*

Be it known that I, MARTIN L. WILLIAMS, a citizen of the United States, residing at South Bend, in the county of St. Joseph and State of Indiana, have invented certain new and useful Improvements in Armored Vehicle-Tires, of which the following is a specification.

This invention relates to improvements in armored vehicle tires and refers more specifically to a mailed armor which may be applied to any ordinary pneumatic or similar tire and which serves the purposes of preventing punctures, preventing slipping or skidding of the wheel, if a traction wheel, and protects the tire proper against wear.

Among the objects of the invention are to provide an armor which may be readily adapted and applied to tires of various sizes and shapes; to provide a construction which effectually protects the tread of the tire against accidental puncturing and laceration; to provide a construction which detracts but slightly from the resilience and elasticity of the tire; to provide a construction which insures a good traction grip and prevents the tire from slipping when used on a traction wheel; to provide a construction which is unaffected by the action of mud, ice and other untoward conditions to which it is naturally subjected in the course of use, and in general to provide an improved construction of the character referred to.

The invention consists in the matters hereinafter described and more particularly pointed out in the appended claim.

Referring to the drawing—Figure 1 is a cross sectional view of an ordinary pneumatic tire of the clencher type equipped with my improved armor; Fig. 2 is a plan view of a fragmentary portion of the tire shown in Fig. 1; Figs. 3 and 4 are plan and edge views, respectively, of one of the plates of which the armor is chiefly composed; Fig. 5 is a plan view of one of the star-shaped links or clips used in uniting the plates; Fig. 6 is an edge elevation of the clip or link shown in Fig. 5 after it has been bent into shape to unite the plates, for example as shown in Fig. 1. Fig. 7 is a detailed view of one of the retaining links.

In the preferred embodiment of the invention illustrated, 1 designates a series of plates which are individually so shaped that their edges provide a plurality of salient angles 2; the series of plates being also so shaped that when arranged edge to edge they fit together and form a substantially complete covering for the tread portion of the tire. In the preferred construction shown the plates are rectangular, and they are united with each other at each of their four corners by means of star-shaped links 3. These links are of malleable metal and have each of their four arms or prongs 4 inserted from the outside inwardly through a corresponding aperture, as 5, in the several angles of the four plates which are tied together by each link, as shown clearly in Figs. 1 and 2. The prongs inserted through the plates are bent toward each other, as best seen in Fig. 6, so as to securely yet flexibly unite the plates. It will be understood that the prongs of the links or clips will be bent inwardly toward each other sufficiently to draw the edges of the plates into close proximity with each other, so that the joints formed between the meeting edges of the plates will be close joints which will prevent the entrance of points which might otherwise puncture the tire.

The body portions of the links or clips lie upon the outside of the armor and in themselves form bosses or projections which add to the gripping ability of the tire, but in order to still further insure against slipping and at the same time relieve the links from the greater part of the wear which comes upon the tread of the wheel, I provide bosses at the centers of each of the plates, as indicated at 6. These bosses are desirably made integral with the plates, and the latter may be either cast or struck up by means of suitable dies. The height of the bosses is, as shown, somewhat greater than the thickness of the body portions of the uniting links so that the main weight upon the tread is borne by the points of these bosses.

Obviously an armor constructed as described may be secured upon tires in various ways, and the manner of securing will be varied with different types of tires. In the particular instance illustrated, the tire designated as a whole 7 is of the clencher type, and is provided, as usual, at its inner edges with thickened ribs 8 which fit and are held within the internal grooves 9 of a clencher rim 10. As a special feature of improvement, I provide upon the armor, adapted to such a tire, a series of specially shaped retaining links 11 connected at suitable intervals apart along each edge of the armor; each link being provided at its upper end with an aperture 12 whereby it is adapted to the corresponding link or clip 3, and being provided at its opposite end with a hook portion 13 which engages the corresponding edge 14 of the clencher rim. The same expansive pressure of the inner tube which retains the tire in place, obviously holds the hooks of the links 11 engaged with the rim; said hooks being interposed between the tire and rim. With this construction the armor may be conveniently and quickly removed by simply deflating the tire sufficiently to allow the hook links to be drawn out.

From the foregoing description it will be seen that I accomplish the several objects of the invention hereinbefore stated and produce an extremely practical and efficient device.

It will be understood that the details of construction may be modified without departing from the spirit of the invention in so far as its broader scope is concerned.

I claim as my invention:

An armor for vehicle tires comprising a series of armor plates of rectangular configuration arranged edge to edge and grouped so that the corners of contiguous plates lie together in groups of four, and star-shaped links flexibly uniting the meeting edges of said plates.

MARTIN L. WILLIAMS.

Witnesses:
 EMILIE ROSE,
 FRANK L. BELKNAP.